Dec. 4, 1962     H. G. BRADSHAW ET AL     3,066,817
CARGO TRANSPORTING VEHICLE WITH EXTENDIBLE CONVEYOR
Filed Nov. 13, 1959                      4 Sheets-Sheet 1

INVENTORS
HAROLD G. BRADSHAW
JOHN W. GUTHRIE
HUGH H. SHAW
BY *Naylor & Neal*
ATTORNEYS Dec. 4, 1962    H. G. BRADSHAW ET AL    3,066,817
CARGO TRANSPORTING VEHICLE WITH EXTENDIBLE CONVEYOR
Filed Nov. 13, 1959    4 Sheets-Sheet 2

INVENTORS
HAROLD G. BRADSHAW
JOHN W. GUTHRIE
HUGH H. SHAW

BY *Naylor & Neal*
ATTORNEYS

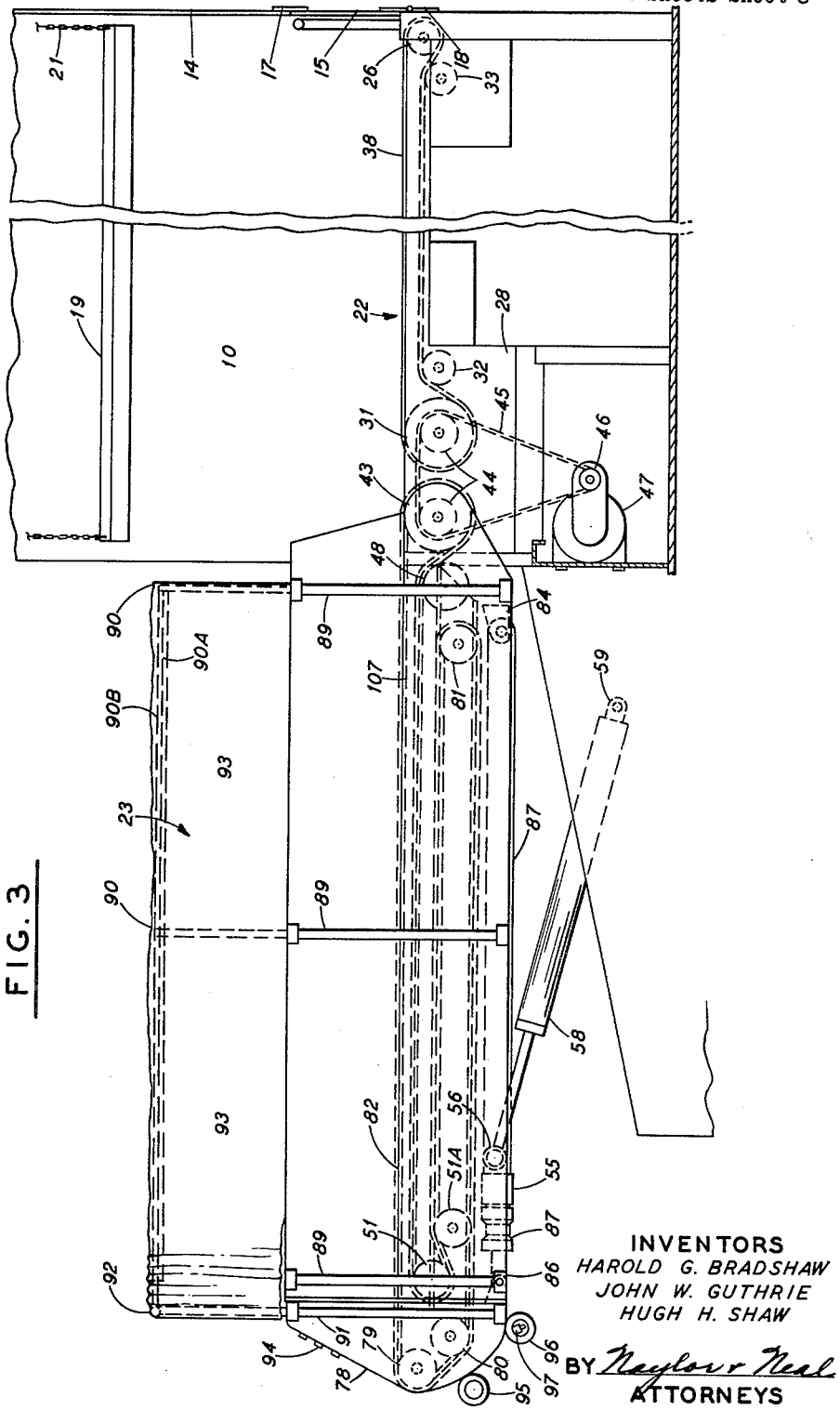

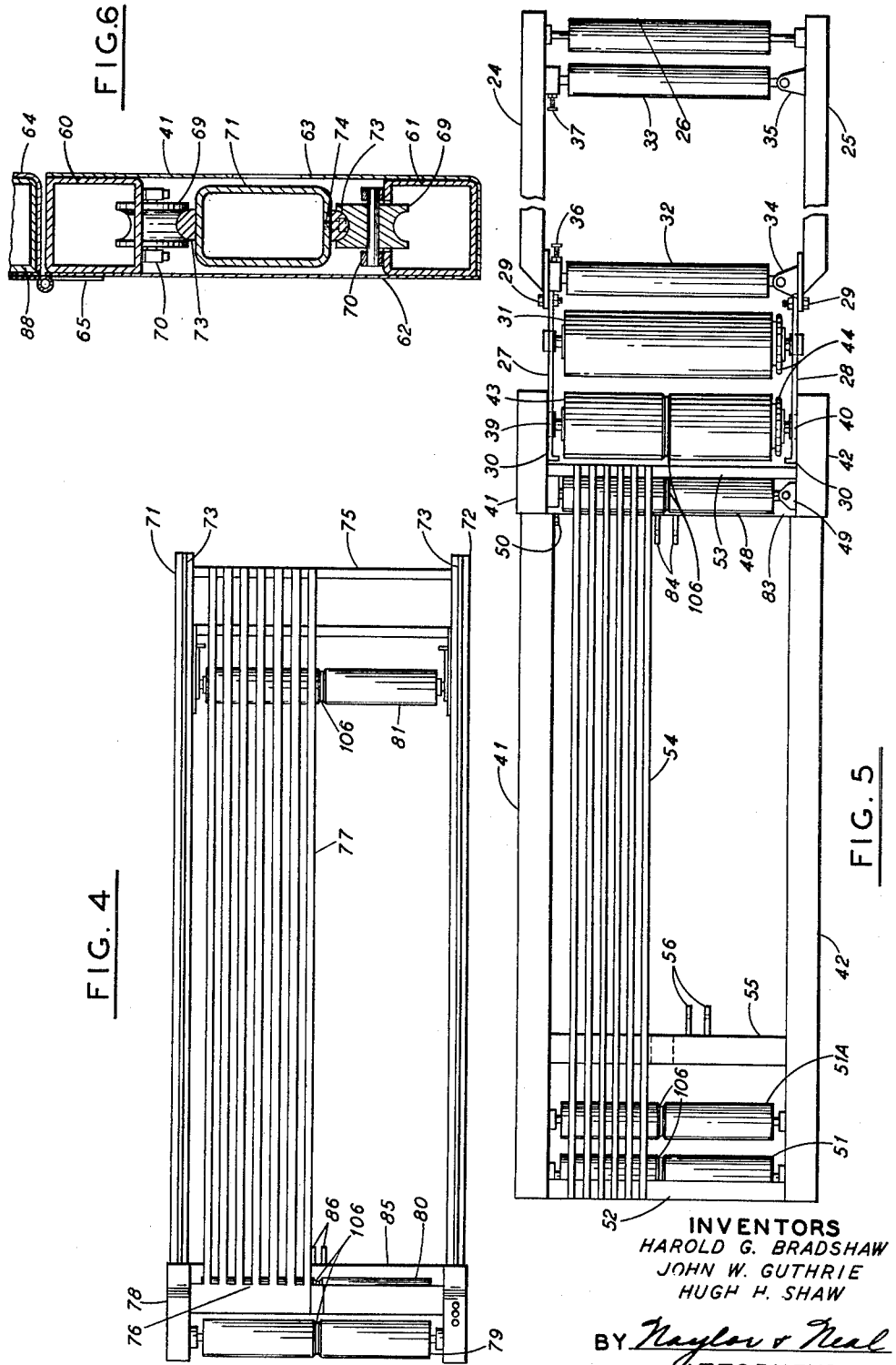

United States Patent Office 3,066,817
Patented Dec. 4, 1962

3,066,817
CARGO TRANSPORTING VEHICLE WITH
EXTENDIBLE CONVEYOR
Harold G. Bradshaw, John W. Guthrie, and Hugh H.
Shaw, Salinas, Calif., assignors to Cochran Equipment
Company, Salinas, Calif., a corporation of California
Filed Nov. 13, 1959, Ser. No. 852,863
28 Claims. (Cl. 214—522)

This invention relates to material handling equipment and more particularly to a cargo transporting vehicle specifically adapted to load and unload baggage into and out of aircraft. This invention also includes a unique new extendible conveyor adapted to convey baggage from the main body from the cargo carrying vehicle to a door in the fuselage of aircraft.

Accordingly it is a principal object of this invention to provide a material handling vehicle capable of transporting a large quantity of materials such as passenger luggage, from a passage terminal to an aircraft runway.

It is a further object of this invention to provide such a material handling apparatus having means for conveying material from the body of a vehicle adjacent the ground to an elevated door in the fuselage of an aircraft.

It is another object of this invention to provide such a material handling vehicle which carries a conveyor for conveying material from the vehicle body to an elevated door in an aircraft fuselage and in which the conveyor is longitudinally extendible and retractable in order to adjust its position with respect to such aircraft fuselage and in which such conveyor may be manually and/or automatically raised and lowered with respect to the vehicle which carries it in order to adjust the height of such conveyor to the height of different doors in different aircraft and in order to automatically change the height of the conveyor to compensate automatically for changes in height of the fuselage of a given aircraft responsive to changes in load distribution inside the aircraft fuselage.

It is a further object of this invention to provide a cargo handling vehicle particularly adapted for use in loading and unloading baggage to and from aircraft where the cargo handling vehicle is useful in tandem with a similar cargo handling vehicle to handle a maximum quantity of cargo being loaded in or unloaded from an aircraft while employing a minimum amount of time in adjusting the positions of such vehicles to the position of the aircraft.

It is another object of this invention to provide such a cargo handling vehicle which is useful alternately to load and unload cargo to and from an aircraft and to load and unload cargo at a passenger terminal baggage counter.

Other objects nd advantages of this invention will become apparent from the following description read in conjunction with the attached drawings in which:

FIGURE 3 is a cross-sectional view of the vehicle of FIGURE 2 taken along the plane and in the direction indicated by the line and arrows at 3—3 in FIGURE 2. In FIGURE 3 both conveyors mounted on the vehicle are illustrated in horizontal positions;

FIGURE 4 is a top plan view of the extendible section of the extendible conveyor illustrated in FIGURES 1 through 3;

FIGURE 5 is a top plan view, partially broken away, of the stationary section of the extendible conveyor, partially illustrated in FIGURE 4, and the mounting means for the stationary portion of such conveyor and for a second stationary conveyor in the vehicle;

FIGURE 6 is a cross-sectional view of the apparatus of FIGURE 1 taken along the plane and in the direction indicated by the line and arrows at 6—6 in FIGURE 1;

Figure 1:
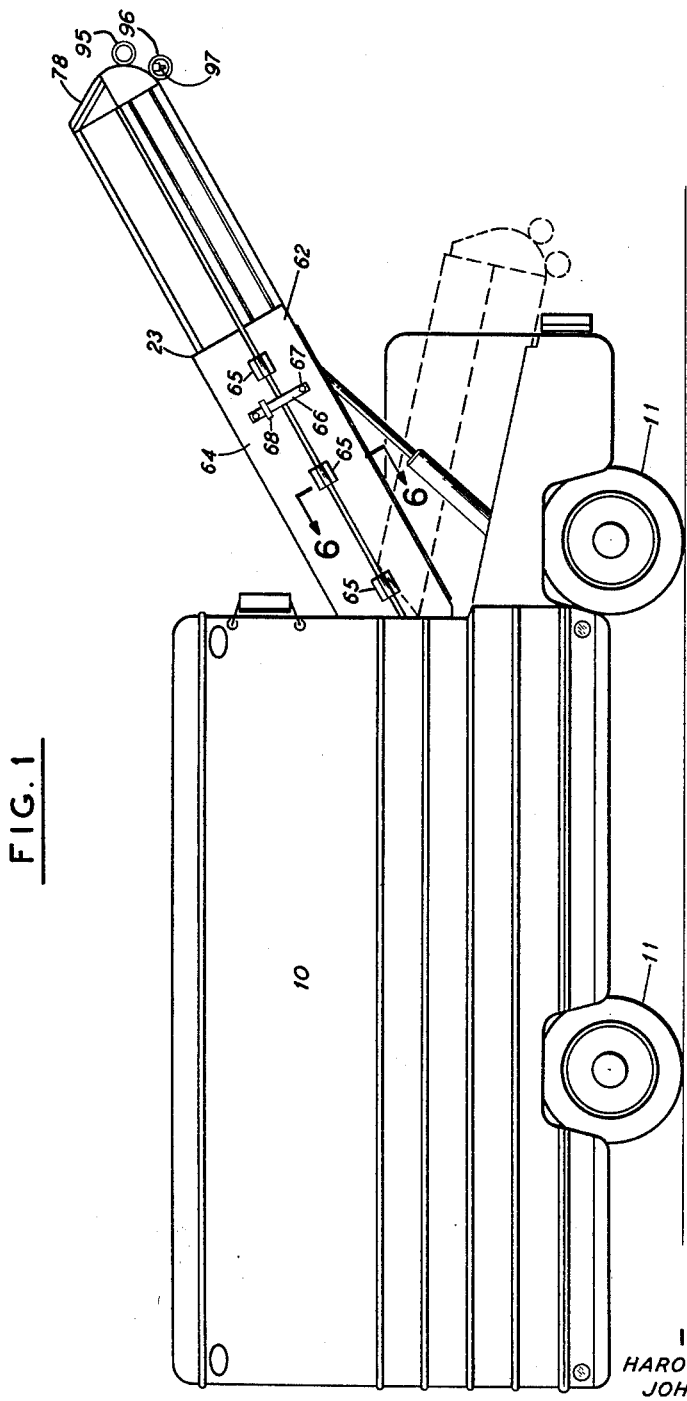
FIGURE 1 is a side elevational view of a cargo handling vehicle constructed in accordance with this invention and in which a cargo handling extendible conveyor is illustrated in its upwardly extending extended position and is illustrated schematically in its downwardly extending retracted position.

Referring now in detail to the drawings, the cargo handling vehicle of this invention comprises a main body portion 10 having ground engaging wheels 11, a forwardly located driver's station indicated generally at 12, and a suitable prime mover indicated generally at 13 for driving the vehicle. The rear wall 14 of the vehicle is provided with a small door 15 (FIGURE 3) and the front wall of the vehicle is provided with a removable fabric closure 16 illustrated in FIGURE 2 in its retracted position. The rear door 15 of the vehicle may be maintained in a closed position by means of latch 17 and may be opened to hang in a vertical position by means of hinge 18. The interior of the vehicle is provided with a number of baggage carrying racks, such as adjustable rack 19 which is adjustably supported on the inner wall of the vehicle by means of hinge 20 and supporting chains 21.

The vehicle is provided with a stationary, generally horizontally disposed, conveyor extending through the interior of the vehicle from a point adjacent one wall thereof; the stationary conveyor is indicated generally by numeral 22 in FIGURE 3. The vehicle is also provided with an extendible conveyor illustrated generally by the numeral 23 in FIGURE 1 and FIGURE 3 and illustrated in detail in FIGURES 3, 4 and 5. The extendible conveyor 23 is pivotally mounted to the vehicle body at a point adjacent the end of stationary conveyor 22, stationary conveyor 22 extending from the conveyor 23 through the body of the vehicle to a point adjacent the remote wall 14 thereof.

As illustrated in FIGURES 3 and 5, the stationary conveyor 22 comprises side supporting members 24 and 25 over the top of which a conveyor supporting plate, not shown, is mounted. A main roller 26 is journalled between members 24 and 25 at one end of conveyor 22. A pair of vertically extending support plates 27 and 28 are connected to members 24 and 25, respectively, at the ends thereof remote from roller 26 by means of bolts 29. Support plates 27 and 28 have flanges 30 on the ends thereof, and flanges 30 are secured at their lower ends to the frame 10 of the vehicle.

Journalled between plates 27 and 28 is a drive roller 31. A pair of idler rollers 32 and 33 are mounted between members 24 and 25 secured thereto by pivotal connection with ears 34 and 35, respectively. Idler rollers 32 and 33 are adjustably positioned with respect to rollers 31 and 26, respectively, by means of adjustment nuts 36 and 37. A conveyor belt 38 extends sequentially over roller 31, roller 26, roller 33, roller 32 and back to roller 31. The top course of conveyor belt 38 lies slightly above the plane of the bottom edge of door 15.

Pivotally mounted in the outer ends of support plates 27 and 28 are journals 39 and 40, respectively, which are welded to the side members 41 and 42, respectively, of the stationary portion of extendible conveyor 23. Rotatably mounted in journals 39 and 40 is a drive roller 43. One edge of each drive roller 31 and 43 is provided with a rigid sprocket wheel 44 thereon over which a roller chain 45 runs. Roller chain 45 also runs over a drive sprocket 46 on the axle of an electric motor 47 mounted on the body 10 of the vehicle.

Mounted between side members 41 and 42 of the stationary section of the extendible conveyor is an idler roller 48 pivotally connected to member 42 by means of ears 49 and adjustably connected to member 41 by means of adjusting nut 50. Journalled between members 41 and 42 at the end thereof remote from roller 43, is an idler roller 51 and a second idler roller 51A is mounted adjacent roller 51. Two horizontal support plates 52 and 53 extend between members 41 and 42 and a plurality of conveyor belt slats 54 are mounted on top of members 52 and 53. It should be noted in FIGURE 5 that only half of the slats 54 are illustrated in the drawings and that a similar group of slats 54 would be mounted on the other side of the central axis of the extendible conveyor.

A support bar 55 is rigidly mounted between members 41 and 42 and a pair of ears 56 are mounted on bar 55. Pivotally mounted between the ears 56 is the free end of the piston rod of an hydraulic lift 58. The cylinder of hydraulic lift 58 is pivotally connected to the frame of the vehicle about axis 59.

As illustrated in FIGURE 6, the support members 41 and 42 comprise vertically spaced square tubes 60 and 61 to the outside of which is attached a cover plate 62 and to the inside of which is attached a cover plate 63. A vertically extending guide railing 64 is mounted on the top of each of members 41 and 42, the railing 64 on member 41 being pivotally mounted thereon by means of hinges 65 illustrated in FIGURES 1 and 6. A latch arm 66 is pivotally mounted on side plate 62 of member 41 by means of pivot pin 67 and is rotatable upwardly to engage a clasp 68 on guide rail 64 thereon to hold guide rail 64 in its upward position. The guide rail 64 on member 41 is accordingly usable alternately in a vertical position to maintain articles on the conveyor 23 and in a lower position when pivoted about hinges 65 to permit movement of articles laterally off of conveyor 23 when unloading the vehicle at a passenger depot. A plurality of pulleys 69 are provided on the interior of members 41 and 42 mounted on square tubes 60 and 62 by means of journals 70. The pulleys 69 are provided in two sets, one set extending longitudinally of each of the square tubes 60 and 61.

The extendible portion of the extendible conveyor 23 comprises longitudinally extending support members 71 and 72, respectively, which are telescopically mounted in support members 41 and 42, respectively. As illustrated in FIGURE 6, an elongated convex rib 73 is provided on the top and bottom of each of the members 71 and 72, the ribs 73 being bolted to the members 71 and 72 by means of recessed bolts 74. The convex surfaces of ribs 73 engage in the concave surfaces of the pulleys 69 mounted inside the members 71 and 72, thereby providing anti-friction mounting between members 41 and 42 on the one hand and members 71 and 72 on the other hand and thus permitting the extendible portion of the conveyor 23 to be moved longitudinally with respect to the stationary portion of such conveyor.

Figure 2:
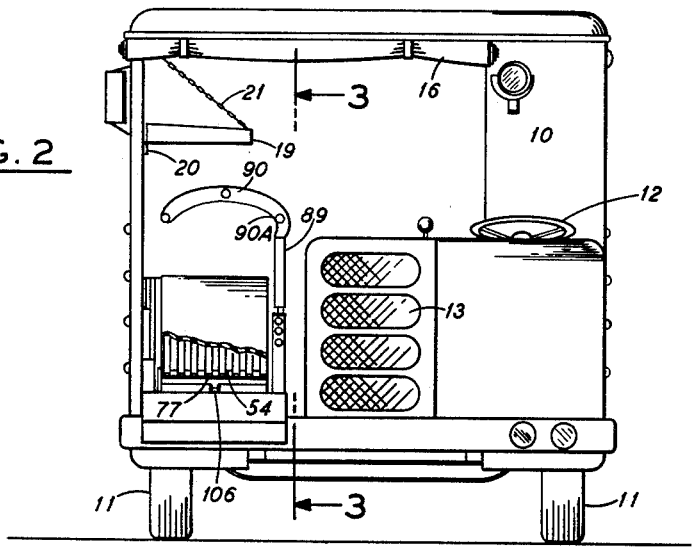
FIGURE 2 is a front elevational view of the vehicle of FIGURE 1 in which a portion of the conveyor surface has been broken away and in which the conveyor is illustrated in a downwardly extending retracted position.

Two support plates 75 and 76 extend between members 71 and 72 at opposite ends thereof and a plurality of elongated slats 77 are mounted on plates 75 and 76. Slats 77 of the extendible portion of the conveyor are suitably positioned to lie between the slats 54 on the stationary portion of the conveyor when the two portions of the conveyor are assembled, as illustrated in FIGURE 2. The slats 54 and 77 together form a flat surface for supporting the conveyor belt of conveyor 23, and a central slot extends between the innermost slats 77 permitting passage of a rib on the conveyor belt as explained in greater detail hereinafter.

A conveyor head portion 78 is mounted on the outside end of the extendible portion of conveyor 23 connecting the side members 71 and 72. A main roller 79 is rotatably mounted in the head member 78 and an idler roller 80 is mounted adjacent thereto adjustably positioned with respect to roller 79. A roller 81 is rotatably mounted between members 71 and 72 at a point remote from roller 79. A continuous conveyor belt 82, illustrated in FIGURE 3, extends sequentially over drive roller 43 hence over idler roller 48, over rollers 51 and 51A, then over roller 81, under roller 80 and over roller 79 and back to roller 43. The section of conveyor belts 82 between rollers 51A and 81 is parallel to the upper course of the conveyor 82, in order that the tensioning of conveyor belt 82 will not have to be adjusted as the conveyor is extended and retracted.

A support plate 83 is rigidly mounted between members 41 and 42 and carries thereon a pair of ears 84. A support member 85 extends between longitudinal support arms 71 and 72 of the extendible portion of the conveyor 23 and carries thereon a pair of ears 86. The hydraulic piston cylinder combination 87, as illustrated in FIGURE 3, is pivotally mounted between ears 84 at one end and ears 86 at the other end, in order to effect extension and contraction of the extendible conveyor 23. Piston cylinder combination 87 is of the type whereby fluid is introduced under pressure to either end of the cylinder 87 to effect power extension or power retraction of the conveyor. The introduction of fluid into piston cylinder combination 87 is effected by a suitable source of fluid under pressure, not shown, and conventional solenoid valves which are actuated by electrical switches.

As illustrated in FIGURE 6, a guide rail 88 is provided on the inside of each of guide rails 64 slidable longitudinally therein. The outer end of guide rail 88 is pivotally connected along its lower edge to the head member 78 of the extendible portion of conveyor 23, thereby permitting guide rail 88 to extend out of guide rail 64 as conveyor 23 is extended, and also permitting the guide rail 88 over support member 71 in FIGURE 4 to pivot to a downwardly extending position about hinges 65 as guide rail 64 on member 41 in FIGURE 5 is pivoted downwardly.

Three vertical awning supports 89 are rigidly mounted on side member 42 of the stationary portion of conveyor 23 and carry generally horizontal portions 90 on the top thereof, as illustrated in FIGURE 2. A similar vertical member 91 is provided on head member 78 of the extendible portion of conveyor 23 and carries a generally horizontal portion 92 on the top thereof. Three longitudinal tubes 90A connect horizontal portions 90, and coaxial rods 90B are provided therein connected to horizontal portion 92 to provide a variable length frame over the extendible conveyor. An awning 93 is provided over the members 89, 90, 91 and 92 to protect conveyor 23 and articles thereon from rain when the equipment is used in rainy weather. The awning 93 is of sufficient length to cover the entire length of conveyor 23 when conveyor 23 is extended to its elongated position, as illustrated in FIGURE 1, and awning 93 is also made of a flexible fabric in order to be collapsible as conveyor 23 is contracted.

As illustrated in FIGURE 3, the drive rollers 31 and 43 of conveyors 22 and 23, respectively, are driven by the same motor 47 and roller chain 45. Operation of motor 47 is controlled by three position switches indicated generally at 94 in FIGURE 3 on the movable end of the extendible conveyor. Preferably the control of such motor is also effected by a similar set of switches located adjacent to rear door 15 of the vehicle and another set of switches located adjacent to roller 43, the latter two sets of switches not being illustrated. Each of the three switches in each set effects either forward, reverse, or neutral movement of motor 47, and switches 94 are connected to their corresponding sets of switches by conventional circuitry, not shown, in order to control movement of the conveyors concurrently. In some instances it may be desirable to drive conveyors 22 and 23 independently, in which case motor 47 should be replaced by two motors and roller chain 45 should be replaced by two chains, one running to each of the rollers 31 and 43.

Figure 7:
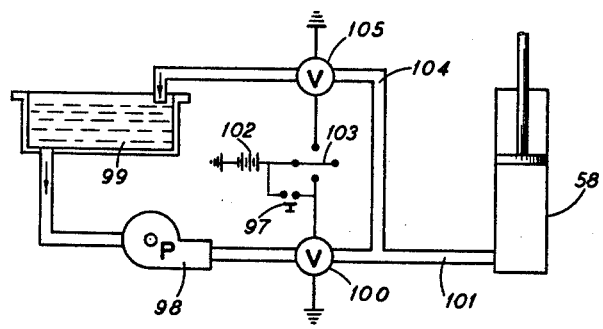
FIGURE 7 is a schematic view of the hydraulic system employed for raising and lowering the extendible conveyor illustrated in FIGURES 1 through 6.

Two flexible bumpers 95 and 96 are mounted on the extendible end of conveyor 23 to prevent damage to the fuselage of an aircraft. Bumper 96 is mounted on the extreme bottom of head member 78 of the extendible conveyor and is adapted to extend over the door sill of a doorway in the aircraft fuselage and rest upon the floor of the cargo space therein. An electrical limit switch 97 is provided inside flexible bumper 96 positioned to be closed by upward deformation of the bottom of member 96 as illustrated in FIGURE 1. Limit switch 97 is connected to the electrical control circuit for hydraulic lift 58 which raises and lowers the extendible conveyor 23. Such electrical circuit is illustrated in FIGURE 7 in which a centrifugal pump 98 is employed to pump hydraulic fluid from a reservoir 99 through a solenoid valve 100, hence to conduit 101 and to hydraulic lift 58. Solenoid valve 100 is energized from a battery 102 through three position switch 103 to deliver fluid to conduit 101. Alternatively, when the weight of conveyor 23 causes sufficient deformation of bumper 96 which rests on the floor of an aircraft to close limit switch 97, battery 102 is connected to solenoid valve 100 to lift conveyor 23 thus reducing such pressure. Hydraulic fluid may be vented from hydraulic lift 58 through conduit 101 and conduit 104 and solenoid valve 105 when battery 102 is connected to solenoid valve 105 by three position switch 103. Limit switch 97, accordingly, when employed with three position switch 103 for controlling the elevation of conveyor 23, prevents conveyor 23 from damaging an aircraft when the pressure between conveyor 23 and the aircraft changes due to changes in loading of cargo in the aircraft.

It should be noted in FIGURES 4 and 5 that each of the rollers 43, 48, 81, 51, 51A, 79 and 80 and conveyor 23 is provided with a central circumferentially extending notch 106. A corresponding ridge 107 is provided on the underside of conveyor belt 82 engaging in such notches 106 to maintain conveyor belt 82 in a central position on the conveyor rollers.

While the device illustrated above employs certain specific component parts in its construction, it is obvious that many variations of such construction may be employed while accomplishing the advantages obtained by such construction. Accordingly this invention is not limited to the specific structure illustrated above, but is limited only by the express terms of the following claims.

What is claimed is:

1. A material handling vehicle for loading and unloading aircraft comprising a body having a compartment therein for carrying airplane cargo, means for supporting and propelling said body, a first belt conveyor one end of which is pivotally mounted on said body for rotation about a horizontal axis, adjustable supporting means interconnecting said body and said first conveyor for supporting the free end of said conveyor in a circular arc about said pivotally mounted end, a second conveyor mounted on said body and extending through at least a portion of said compartment from a point adjacent the pivotally mounted end of said first conveyor, the adjacent ends of said first and second conveyors being at substantially the same level, and drive means for driving said two conveyors including two directional drive means for driving said first conveyor to load and unload said vehicles.

2. The material handling vehicle of claim 1 in which common driving means is provided for both of said conveyors.

3. A material handling vehicle for loading and unloading aircraft comprising a chassis, means for propelling said chassis, a body supported on said chassis and having a compartment therein for carrying airplane cargo, a firt belt conveyor one end of which is pivotally mounted on said body for rotation about a horizontal axis, adjustable supporting means interconnecting said body and said first conveyor for supporting said first conveyor in a plurality of positions at different angles to said body said positions describing a circular sector lying on one side of the vertical plane through said pivotally supported end of said conveyor and said sector including the horizontal plane through said pivotally supported end of said conveyor, a second belt conveyor mounted on said body in alignment with said first belt conveyor and extending from a point adjacent the pivotally supported end of said first conveyor away from said sector and through said cargo carrying compartment to a point adjacent a side of said body remote from said first conveyor, the adjacent ends of said first and second conveyors being at substantially the same level, and two directional drive means for driving said first conveyor and said second conveyor to load and unload said vehicles.

4. An extensible conveyor comprising a first frame carrying a first drive roller adjacent one end thereof and a first idler roller remote from said first drive roller, a second frame telescopically mounted on said first frame for relative movement with respect thereto and carrying a second drive roller on the end thereof remote from said first frame and a second idler roller remote from said second drive roller and intermediate of said first drive roller and said first idler roller, a continuous conveyor belt extending sequentially over said first drive roller, said second drive roller, said second idler roller and said first idler roller, the section of belt between said first and second drive rollers being parallel to the section of belt between said first and second idler rollers whereby uniform tension on the belt is obtained at the various telescopic positions of the two frames, auxiliary idler rollers compressing the underside of the lower course of belt on said first drive roller and the underside of the lower course of belt on said first idler roller whereby the distance between top and bottom courses of said belt is reduced, and adjustable positioning means for moving said second frame to a plurality of positions with respect to said first frame.

5. The extensible conveyor of claim 4 characterized further by the provision of a support plate supporting the upper course of said first conveyor, said support plate comprising two meshing sets of elongated slats, one set rigidly mounted on said first frame and one set rigidly mounted on said second frame, the upper surfaces of all of said slats being co-planar.

6. The extensible conveyor of claim 4 in which each of said rollers is provided with a central circumferentially extending groove therein and said belt is provided with a ridge thereon which engages in said grooves.

7. The extensible conveyor of claim 4 in which one of said frames carries two guide members on opposite sides thereof extending longitudinally of said frame, each of said guide members having two opposed axially extending generally semi-cylindrical bearing surfaces thereon and two sets of opposed pulleys are provided in the other of said frames positioned to embrace said bearing surfaces.

8. A material handling vehicle comprising a body having a cargo carrying compartment therein, means for supporting and propelling said body, a first belt conveyor one end of which is pivotally mounted on said body for rotation about a horizontal axis, adjustable supporting means interconnecting said body and said first conveyor for supporting the free end of said conveyor in a circular arc about said pivotally mounted end, a second conveyor mounted on said body and extending through said compartment from a point adjacent the pivotally mounted end of said first conveyor to a point adjacent a side of said vehicle remote from said first conveyor, the adjacent ends of said first and second conveyors being at substantially the same level, and drive means for driving said two conveyors including two directional drive means for driving said first conveyor to load and unload said vehicle and in which a door is provided in said body in alignment with the end of said second conveyor remote from said first conveyor.

9. A material handling vehicle comprising a body having a cargo carrying compartment therein, means for supporting and propelling said body, a first belt conveyor one end of which is pivotally mounted on said body for rotation about a horizontal axis, adjustable supporting means interconnecting said body and said first conveyor for supporting the free end of said conveyor in a circular arc about said pivotally mounted end, a second conveyor mounted on said body and extending through at least a portion of said compartment from a point adjacent the pivotally mounted end of said first conveyor, the adjacent ends of said first and second conveyors being at substantially the same level, and drive means for driving said two conveyors including two directional drive means for driving said first conveyor to load and unload said vehicle and in which common driving means is provided for both of said conveyors and electrical control means is provided for controlling the operation and direction of movement of said conveyors, and said control means can be operated from three positions, one adjacent to the pivotally connected end of said first conveyor and one at each of the remote ends of said first and second conveyors.

10. A material handling vehicle comprising a body having a cargo carrying compartment therein, means for supporting and propelling said body, a first belt conveyor one end of which is pivotally mounted on said body for rotation about a horizontal axis, adjustable supporting means interconnecting said body and said first conveyor for supporting the free end of said conveyor in a circular arc about said pivotally mounted end, a second conveyor mounted on said body and extending through at least a portion of said compartment from a point adjacent the pivotally mounted end of said first conveyor, the adjacent ends of said first and second conveyors being at substantially the same level, and drive means for driving said two conveyors including two directional drive means for driving said first conveyor to load and unload said vehicle and in which said first conveyor comprises a fixed portion pivotally connected to said body and carrying a drive roller adjacent the pivotally connected end thereof and a first idler roller remote from said drive roller, a movable portion telescopically mounted on said fixed portion for relative movement with respect thereto and carrying a driven roller on the end thereof remote from said fixed portion and a second idler roller remote from said driven roller and intermediate of said drive roller and said first idler roller, a continuous conveyor belt extending sequentially over said drive roller, said driven roller, said second idler roller, and said first idler roller, the section of belt between said drive and driven rollers being parallel to the section of belt between said first and second idler rollers whereby uniform tension on the belt is obtained at the various telescopic positions of said portions, and adjustable positioning means for moving said movable portion to a plurality of positions with respect to said fixed portion.

11. The material handling vehicle of claim 10 characterized further by the provision of auxiliary idler rollers compressing the underside of the lower course of belt on said drive roller and the lower course of belt on said first idler roller whereby the distance between top and bottom courses of said belt is reduced.

12. The material handling vehicle of claim 11 in which said first conveyor is provided with a support plate supporting the upper course of said first conveyor, said support plate comprising two meshing sets of elongated slats, one set rigidly mounted on said fixed portion of said first conveyor, and one set rigidly mounted on said movable portion of said first conveyor, the upper surfaces of all of said slats being coplanar.

13. The material handling vehicle of claim 11 in which each of said rollers is provided with a central circumferentially extending groove therein and said belt is provided with a ridge thereon which engages in said grooves.

14. The material handling vehicle of claim 11 in which said movable portion of said first conveyor carries two guide members on opposite sides thereof extending longitudinally of said movable portion, each of said guide members having two opposed axially extending generally semi-cylindrical bearing surfaces thereon and two sets of opposed pulleys are provided in said fixed portion of said first conveyor positioned to embrace said semi-cylindrical surfaces on said movable portion of said first conveyor.

15. A material handling vehicle comprising a body having a cargo carrying compartment therein, means for supporting and propelling said body, a first belt conveyor one end of which is pivotally mounted on said body for rotation about a horizontal axis, adjustable supporting means interconnecting said body and said first conveyor for supporting the free end of said conveyor in a circular arc about said pivotally mounted end, a second conveyor mounted on said body and extending through at least a portion of said compartment from a point adjacent the pivotally mounted end of said first conveyor, the adjacent ends of said first and second conveyors being at substantially the same level, and drive means for driving said two conveyors including two directional drive means for driving said first conveyor to load and unload said vehicle and in which said body is provided with a roof extending over said cargo carrying compartment and said second conveyor, and in which said first conveyor is provided with a canopy support frame attached to said conveyor and extending over substantially the entire length thereof, said support frame being constructed of two frame portions movable with respect to each other to adapt said frame to changes in length of said conveyor, and a flexible canopy covering said support frame.

16. A material handling vehicle comprising a body having a cargo carrying compartment therein, means for supporting and propelling said body, a first belt conveyor one end of which is pivotally mounted on said body for rotation about a horizontal axis, adjustable supporting means interconnecting said body and said first conveyor for supporting the free end of said conveyor in a circular arc about said pivotally mounted end, a second conveyor mounted on said body and extending through at least a portion of said compartment from a point adjacent the pivotally mounted end of said first conveyor, the adjacent ends of said first and second conveyors being at substantially the same level, and drive means for driving said two conveyors including two directional drive means for driving said first conveyor to load and unload said vehicle and in which pressure-responsive means are provided on the free end of said first conveyor which, responsive to pressure on said pressure-responsive means, actuate said adjustable supporting means.

17. A material handling vehicle comprising a chassis, means for propelling said chassis, a body supported on said chassis and having a cargo carrying compartment therein, a first belt conveyor one end of which is pivotally mounted on said body for rotation about a horizontal axis, adjustable supporting means interconnecting said body and said first conveyor for supporting said first conveyor in a plurality of positions at different angles to said body said positions describing a circular sector lying on one side of the vertical plane through said pivotally supported end of said conveyor and said sector including the horizontal plane through said pivotally supported end of said conveyor, a second belt conveyor mounted on said body in alignment with said first belt conveyor and extending from a point adjacent the pivotally supported end of said first conveyor away from said sector and through said cargo carrying compartment to a point adjacent a side of said body remote from said first conveyor, the adjacent ends of said first and second conveyors being at substantially the same level, and two directional drive means for driving said first conveyor and said second conveyor to load and unload said vehicle and in which said adjustable support means comprises a hydraulic jack one end of which is pivotally connected to said body and the other end of which is pivotally connected to said first conveyor, and pressure-responsive means are provided on the end of said first conveyor remote from said body said pressure-responsive means being operable to withdraw and introduce fluid from and to said hydraulic cylinder responsive to excessive pressure and lack of pressure respectively on said pressure-responsive means.

18. A material handling vehicle comprising a chassis, means for propelling said chassis, a body supported on said chassis and having a cargo carrying compartment therein, a first belt conveyor one end of which is pivotally mounted on said body for rotation about a horizontal axis, adjustable supporting means interconnecting said body and said first conveyor for supporting said first conveyor in a plurality of positions at different angles to said body, said positions describing a circular sector lying on one side of the vertical plane through said pivotally supported end of said conveyor and said sector including the horizontal plane through said pivotally supported end of said conveyor, a second belt conveyor mounted on said body in alignment with said first belt conveyor and extending from a point adjacent the pivotally supported end of said first conveyor away from said sector and through said cargo carrying compartment to a point adjacent a side of said body remote from said first conveyor, the adjacent ends of said first and second conveyors being at substantially the same level, and two directional drive means for driving said first conveyor and said second conveyor to load and unload said vehicle and in which said first and second conveyors are both provided with rigid supporting platforms extending over substantially their entire length and supporting the upper courses of the belts on said conveyors.

19. A material handling vehicle comprising a chassis, means for propelling said chassis, a body supported on said chassis and having a cargo carrying compartment therein, a first belt conveyor one end of which is pivotally mounted on said body for rotation about a horizontal axis, adjustable supporting means interconnecting said body and said first conveyor for supporting said first conveyor in a plurality of positions at different angles to said body, said positions describing a circular sector lying on one side of the vertical plane through said pivotally supported end of said conveyor and said sector including the horizontal plane through said pivotally supported end of said conveyor, a second belt conveyor mounted on said body in alignment with said first belt conveyor and extending from a point adjacent the pivotally supported end of said first conveyor away from said sector and through said cargo carrying compartment to a point adjacent a side of said body remote from said first conveyor, the adjacent ends of said first and second conveyors being at substantially the same level, and two directional drive means for driving said first conveyor and said second conveyor to load and unload said vehicle and in which said first and second conveyors are driven by the same driving means and said driving means is operated by three concurrent control means, one located at a point adjacent the pivotally mounted end of said first conveyor and one located at each of the remote ends of said first and second conveyors.

20. A material handling vehicle comprising a chassis, means for propelling said chassis, a body supported on said chassis and having a cargo carrying compartment therein, a first belt conveyor one end of which is pivotally mounted on said body for rotation about a horizontal axis, adjustable supporting means interconnecting said body and said first conveyor for supporting said first conveyor in a plurality of positions at different angles to said body, said positions describing a circular sector lying on one side of the vertical plane through said pivotally supported end of said conveyor and said sector including the horizontal plane through said pivotally supported end of said conveyor, a second belt conveyor mounted on said body in alignment with said first belt conveyor and extending from a point adjacent the pivotally supported end of said first conveyor away from said sector and through said cargo carrying compartment to a point adjacent a side of said body remote from said first conveyor, the adjacent ends of said first and second conveyors being at substantially the same level, and two directional drive means for driving said first conveyor and said second conveyor to load and unload said vehicle and in which a door is provided in said body in alignment with the end of said second conveyor remote from said first conveyor.

21. A material handling vehicle comprising a chassis, means for propelling said chassis, a body supported on said chassis and having a cargo carrying compartment therein, a first belt conveyor one end of which is pivotally mounted on said body for rotation about a horizontal axis, adjustable supporting means interconnecting said body and said first conveyor for supporting said first conveyor in a plurality of positions at different angles to said body, said positions describing a circular sector lying on one side of the vertical plane through said pivotally supported end of said conveyor and said sector including the horizontal plane through said pivotally supported end of said conveyor, a second belt conveyor mounted on said body in alignment with said first belt conveyor and extending from a point adjacent the pivotally supported end of said first conveyor away from said sector and through said cargo carrying compartment to a point adjacent a side of said body remote from said first conveyor, the adjacent ends of said first and second conveyors being at substantially the same level, and two directional drive means for driving said first conveyor and said second conveyor to load and unload said vehicle and in which a roof is provided on said body covering said cargo carrying compartment and said second conveyor and said first conveyor is provided with a canopy support frame attached to said conveyor and extending over substantially the entire length thereof, said support frame being constructed of two frame portions movable with respect to each other to adapt said frames to changes in length of said conveyor, and a flexible canopy covering said support frame.

22. A material handling vehicle comprising a chassis, means for propelling said chassis, a body supported on said chassis and having a cargo carrying compartment therein, a first belt conveyor one end of which is pivotally mounted on said body for rotation about a horizontal axis, adjustable supporting means interconnecting said body and said first conveyor for supporting said first conveyor in a plurality of positions at different angles to said body, said positions describing a circular sector lying on one side of the vertical plane through said pivotally supported end of said conveyor and said sector including the horizontal plane through said pivotally supported end of said conveyor, a second belt conveyor mounted on said body in alignment with said first belt conveyor and extending from a point adjacent the pivotally supported end of said first conveyor away from said sector and through said cargo carrying compartment to a point adjacent a side of said body remote from said first conveyor, the adjacent ends of said first and second conveyors being at substantially the same level, and two directional drive means for driving said first conveyor and said second conveyor to load and unload said vehicle and in which said first conveyor comprises a fixed portion pivotally connected to said body and carrying a drive roller adjacent the pivotally connected end thereof and a first idler roller remote from said drive roller, a movable portion telescopically mounted on said fixed portion for relative movement with respect thereto and carrying a driven roller on the end thereof remote from said fixed portion and a second idler roller remote from said driven roller and intermediate of said drive roller and said first idler roller, a continuous conveyor belt extending sequentially over said drive roller, said driven roller, said second idler roller, and said first idler roller, the section of belt between said drive and driven rollers being parallel to the section of belt between said first and second idler rollers whereby uniform tension on the belt is obtained at the various telescopic positions of said two portions, and adjustable positioning means for moving said movable portion to a plurality of positions with respect to said fixed portion.

23. The material handling vehicle of claim 22 in which said movable portion of said first conveyor carries two guide members on opposite sides thereof extending longitudinally of said movable portion, each of said guide members having two opposed axially extending generally semi-cylindrical bearing surfaces thereon and two sets of opposed pulleys are provided in said fixed portion of said first conveyor positioned to embrace said semi-cylindrical surfaces on said movable portion of said first conveyor.

24. The material handling vehicle of claim 22 in which said first conveyor is provided with a support plate supporting the upper course of said first conveyor, said support plate comprising two meshing sets of elongated slats, one set rigidly mounted on said fixed portion of said first conveyor, and one set rigidly mounted on said movable portion of said first conveyor, the upper surfaces of all of said slats being co-planar.

25. The material handling vehicle of claim 22 in which said adjustable positioning means for moving said movable portion of said first conveyor with respect to said fixed portion comprises a first hydraulic cylinder, said adjustable supporting means for supporting said first conveyor comprises a second hydraulic cylinder pivotally connected at one end to said body and pivotally connected at its other end to said fixed portion of said first conveyor, and pressure-responsive means is provided on the end of said movable portion of said first conveyor remote from said fixed portion, said pressure-responsive means adapted to control withdrawal of fluid from, and an introduction of fluid to, said second hydraulic cylinder responsive, respectively to extreme pressure on and lack of pressure on said pressure-responsive means.

26. The material handling vehicle of claim 22 in which a roof is provided on said body covering said compartment and said second conveyor, a canopy is provided covering said first conveyor and a canopy support is provided on said first conveyor to support said canopy, said canopy support comprising a plurality of arms extending upwardly from one side of said fixed portion of said first conveyor and across said fixed portion, a plurality of tubular support members extending parallel to said first conveyor and connecting said arms, an arm extending upwardly from the free end of said movable portion of said first conveyor and across said movable portion and a tubular support connected to said arm and telescopically engaging said first tubular support.

27. A cargo carrying vehicle for loading cargo on aircraft through a cargo door on the aircraft having an upwardly facing door sill comprising a body having a cargo carrying compartment therein, means for supporting and propelling said body, a conveyor having first and second ends with said first end pivotally mounted on said body for rotation about a generally horizontal axis and with said first end positioned to receive cargo from said compartment, adjustable supporting means for supporting said second end of said conveyor at different elevations in a generally circular arc about said pivotally mounted end, means for driving said conveyor, and fuselage sensing means mounted on said second end of said conveyor for sensing the proximity of said sill of said cargo door to said second end with said sensing means connected to said adjustable support means for actuating said adjustable support means to change the elevation of said second end of said conveyor above the ground responsive to changes in the elevation of said door sill sensed by said sensing means.

28. The cargo carrying vehicle of claim 27 characterized further by the inclusion of means on said vehicle including conveyor means for conveying cargo between said conveyor and a second similar vehicle positioned adjacent to said vehicle.

References Cited in the file of this patent

UNITED STATES PATENTS

| | | |
|---|---|---|
| 710,611 | Ray | Oct. 7, 1902 |
| 2,150,211 | Edwards | Mar. 14, 1939 |
| 2,166,447 | Ruppenthal | July 18, 1939 |
| 2,419,824 | Davis | Apr. 29, 1947 |
| 2,593,158 | Lorig | Apr. 15, 1952 |
| 2,609,115 | Oklejas | Sept. 2, 1952 |
| 2,886,375 | Crawford | May 12, 1959 |
| 2,931,531 | Brudi | Apr. 5, 1960 |